July 18, 1950 T. B. JOHNSON 2,515,773
FASTENING MEMBER
Filed Jan. 26, 1949

INVENTOR.
Thomas B. Johnson
BY
J. Stanley Churchill.
ATTORNEY

Patented July 18, 1950

2,515,773

UNITED STATES PATENT OFFICE 2,515,773

FASTENING MEMBER

Thomas B. Johnson, Ambridge, Pa., assignor to H. H. Robertson Company, Pittsburgh, Pa., a corporation of Pennsylvania Application January 26, 1949, Serial No. 72,950

1 Claim. (Cl. 85—20)

This invention relates to a fastener and more particularly to a fluted fastening member or drive screw.

The invention has for an object to provide a novel fluted fastening member or a drive screw adapted to be driven into and to form grooves in the walls of a predrilled opening in one of the members to be fastened together and which is characterized by structure adapted to effect self-locking of the fastening member in the member in a simple and efficient manner.

A further object of the invention is to provide a novel fastener of the character described which may be used with advantage in economically and efficiently fastening metal roofing and siding sheets to the structural framework of a building.

With these general objects in view and such others as may hereinafter appear, the invention consists in the fastener hereinafter described and particularly defined in the claim at the end of this specification.

Figure 1:
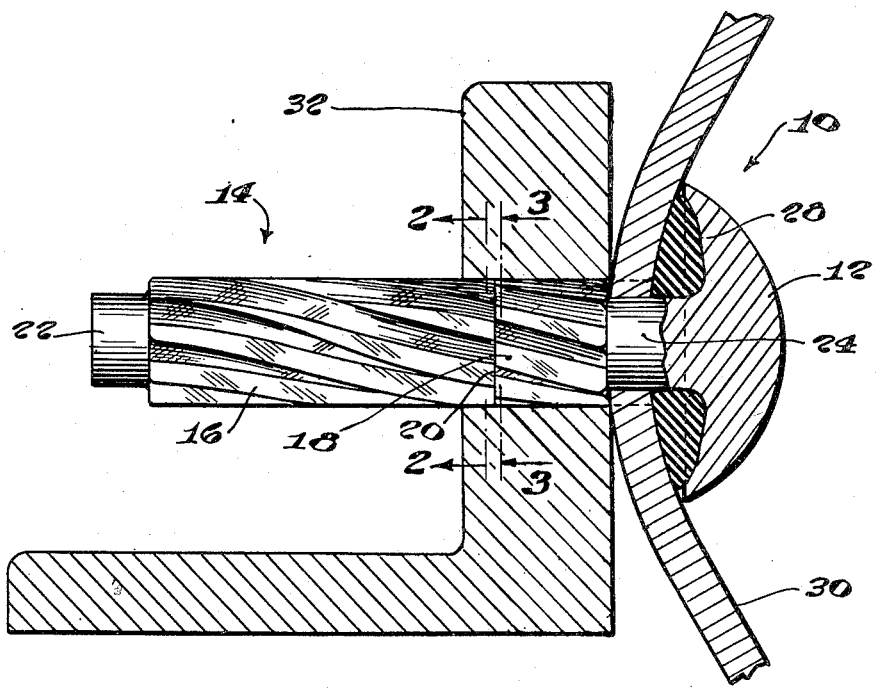
Figure 2:
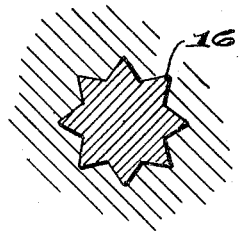
Figure 3:
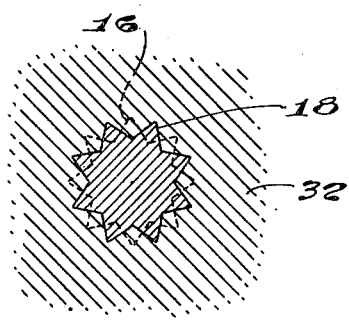

In the drawings illustrating the preferred embodiment of the invention, Fig. 1 is a side elevation, partly in cross-section of the present fluted fastening member; and Figs. 2 and 3 are cross-sectional views taken on the lines 2—2 and 3—3 respectively of Fig. 1.

A drive screw embodying the present invention is provided with a head and with a shank portion. The portion of the shank remote from the head is provided with one set of cutting elements comprising preferably spiral threads capable of cutting one set of spaced grooves in the wall of an elongated hole in a metal member into which the shank is driven. A second set of groove forming cutting elements is disposed between the first set and the head of the fastening member, and the cutting elements are offset circumferentially with relation to the elements of the first set so that the groove forming operation of the second set, as the shank is continued to be driven into the hole, serves to close the grooves formed by the first set by metal displaced by the operation of the second set, thereby forming a metal barrier resisting successfully the withdrawal of the fastening member from its driven position.

Referring now to the drawings, the present fluted drive screw, indicated generally at 10, comprises a head portion 12 and a shank portion 14. The shank portion is provided with two sets of spiral flutes or threads consisting of a leading set of threads 16 and a second set 18, the latter being offset relative to the first set to dispose the threads of the second set substantially in alignment with the grooves of the first set at the point of transformation, indicated generally at 20. The threads 16 and 18 constitute cutting elements and are generally V-shaped in transverse cross-section, each thread having sides which diverge inwardly from the sharp ridge thereof at an angle of about 60° to each other as illustrated in Figs. 2 and 3. The side faces of adjacent threads 16 and 18 intersect to form V-shaped grooves between the threads. The shank portion 14 is further provided with a reduced diameter end portion or pilot 22 for centering the screw in a pre-drilled opening in the parts to be fastened, and with a reduced diameter portion 24 between the underside of the head 12 and the second set of threads 18. In practice, a waterproof washer or gasket 26, such as a neoprene gasket, is interposed between the head of the screw and the corrugated sheet 30 being fastened to thereby form a firm and water tight seal. The length of the reduced diameter portion 24 between the underside of the head and the upper end of the threads 18 is preferably proportioned relative to the corrugated sheet 30 being fastened, so as to extend through the sheet 30, as illustrated in Fig. 1 and in practice the diameter of the portion 24 and also the pilot 22 may and preferably will be substantially equal to the root diameter of the fluted threads 16, 18. The underside of the head 12 is also provided with an annular concave groove 28 to retain the washer 26 under the head during the driving operation and to effect compression of the washer about the portion 24 and the upper surface of the sheet 30 or other member being fastened to assure a water tight seal.

The fluted drive screw 10 is herein illustrated as embodied in a roofing structure and is shown in operative position securing a corrugated sheet member 30, such as a corrugated protected metal roofing or siding sheet, to a structural steel supporting member, such as a purlin 32 of the building. Such building sheets may comprise a steel core sheet having an asphalt impregnated asbestos felt bonded thereto and having an exterior weatherproofing coating, as manufactured under United States Patents No. 1,277,755 and No. 1,862,332. In order to prepare the corrugated sheet 30 and also the purlin or other structural element for the reception of the drive screw, it is preferred to drill holes of one size, corresponding to the size of the pilot 22, through the sheet 30 and into or through the purlin 32 depending on the length of the drive screw to be used, as will be apparent from inspection of Fig. 1. While the size of the hole to be drilled in the sheet 30 may vary substantially and still have the drive screw effective depending on the size of the head 12, nevertheless the size of the hole to be drilled in the purlin or equivalent structural member must be substantially smaller than the diameter of the threaded or fluted portions of the drive screw, so that the desired grooves may be cut in the wall of the hole when the screw is driven into place.

After the holes have been drilled as described, the pilot 22 of the screw is then inserted into the hole in the sheet 30 to center the screw and the screw is then driven into place by successive hammer blows. As the screw is being driven, the leading set of threads 16 cut grooves in the wall of the drilled hole in the purlin or equivalent structural element. The second set of threads 18, which may be exactly the same as or different than the leading set of threads 16 with respect to size, contour and pitch of spiral, except that they are formed in offset relation thereto, then follow along and cut similar grooves midway between the grooves cut by the leading threads. The metal being thus displaced is forced into the grooves formed by the leading threads, thus producing a metal barrier or lock preventing withdrawal of the screw and preventing loosening of the same when subjected to an upward force or to vibration during the driving of an adjacent screw, or subsequently during the life of the building. The screw thus driven and locked in place also maintains the washer 26 in a compressed condition to form a positive and water tight seal between the head of the screw and the outer surface of the sheet 30, and around the portion 24 of the screw and covering the hole in the sheet 30. The washer may and preferably will comprise a synthetic rubber washer such as neoprene, characterized by its neutrality to asphalts, oils, dilute acids and the like, and also being unaffected by severe temperature changes.

In the illustrated embodiment of the invention, the point of transformation from one set of threads to the next, as indicated at 20, is proportioned relative to the parts being fastened so as to extend a substantial distance into the underlying member of two or more parts being secured together, herein shown as the structural steel member 32, although in practice, the proportions of the drive screw may be varied to suit particular conditions or thickness of the metal, the point of transformation in any event being extended at least partially into the underlying member to lock the parts together. The drive screws may be made of a metal such as stainless steel and heat treated to provide the required hardness to permit the threads to cut into the relatively softer metal of the parts being fastened. In practice the upper ends of the leading set of threads are preferably cut off square so as to minimize any tendency thereof to cut into the metal constituting the lock, while preferably the upper ends of the second set of threads may be chamfered slightly so as to prevent cutting of the protective coatings of the sheet 30.

From the above description it will be observed that the present construction of fluted drive screw is adapted to form a locking barrier in the member into which it is driven in a simple and efficient manner and provides a superior self-locking drive screw suitable for general use wherever a fluted drive screw is desired and when embodied in a roofing or siding structure, the present screw enables the roofing or siding to be erected entirely from the top or outside of the building thereby eliminating inside scaffolding and enabling the building to be rapidly and economically erected. Although the groove cutting elements or flutes of the drive screw are herein illustrated as comprising spiral flutes or threads, it will be apparent that two consecutive sets of longitudinally extended flutes, parallel to the axis of the shank and having one set offset relative to the other will effect locking of the screw in the parts in a similar manner, the second set closing the grooves formed by the first set to form a barrier locking the screw in its driven position.

While the preferred embodiment of the invention has been herein illustrated and described, it will be understood that the invention may be embodied in other forms within the scope of the following claim.

Having thus described the invention, what is claimed is:

A ferrous metal drive-fastener for securing a plurality of metallic structural members together, comprising: a member having a head and an elongated shank extending from said head, the portion of said shank remote from the head having a first set of longitudinally extending and circumferentially spaced V-shaped spiral cutting elements with the sides of the respective cutting elements diverging inwardly at an angle of about 60° to each other and with the sides of adjacent cutting elements intersecting to provide V-shaped spiral grooves between said cutting elements, said cutting elements being capable of cutting one set of spaced grooves in the wall of a circular hole in a metal member as said shank is driven therein, said shank also having a second set of similar V-shaped spiral cutting elements and V-shaped spiral grooves disposed between the first set and the head of the fastening member and offset circumferentially with relation to the cutting elements of the first set so that the ends of the cutting elements of the first set lie about midway between the adjacent ends of the cutting elements of the second set, the upper ends of the cutting elements of the first set and the lower ends of the cutting elements of the second set being disposed in a substantially common plane perpendicular to the axis of said shank, the circumferential width of the cutting elements and the depth of the grooves of both sets being substantially the same, whereby the grooves in the wall formed by the cutting operation of the first set of cutting elements are subsequently closed by the cutting operation of the second set of cutting elements when the fastener member is driven into said hole, thereby forming a metal barrier above the first set of cutting elements resisting the withdrawal of the fastener member from its driven position.

THOMAS B. JOHNSON.

REFERENCES CITED

The following references are of record in the file of this patent:

UNITED STATES PATENTS

| Number | Name | Date |
|---|---|---|
| 1,335,756 | Scharff | Apr. 6, 1920 |
| 2,095,153 | Rosenberg | Oct. 5, 1937 |
| 2,099,990 | Rosenberg | Nov. 23, 1937 |
| 2,236,804 | Miller | Apr. 1, 1941 |

FOREIGN PATENTS

| Number | Country | Date |
|---|---|---|
| 508,673 | Great Britain | July 4, 1939 |